3,267,201
BONDED MESSENGER CABLE WITH MESSENGER ADHESIVELY BONDED TO A COMMON SUPPORT JACKET
Brandon B. Pusey and Warner T. Smith, Hickory, N.C., assignors to Superior Cable Corporation, Hickory, N.C., a corporation of North Carolina
Filed Oct. 4, 1963, Ser. No. 314,011
3 Claims. (Cl. 174—41)

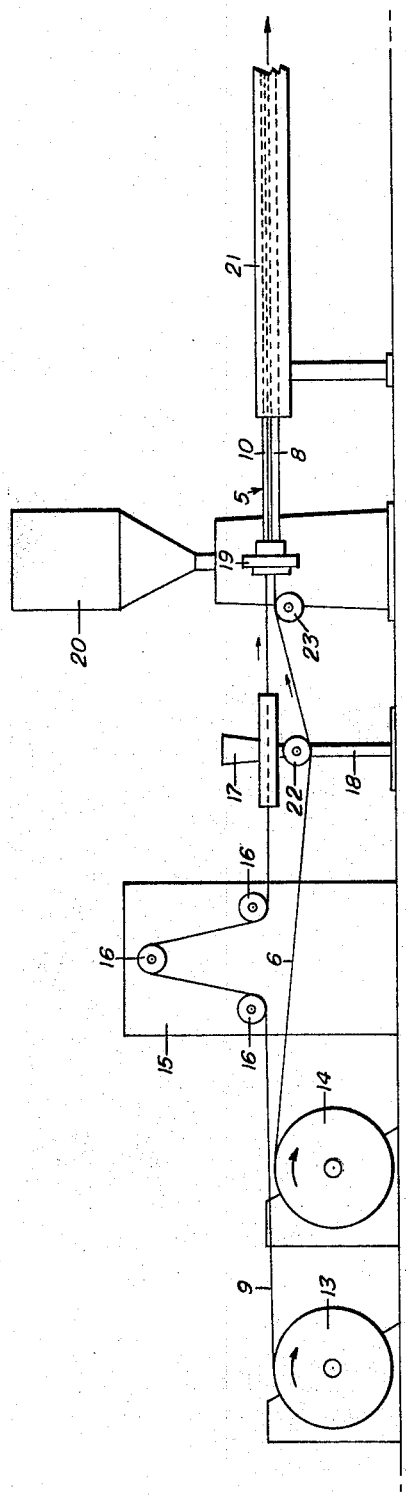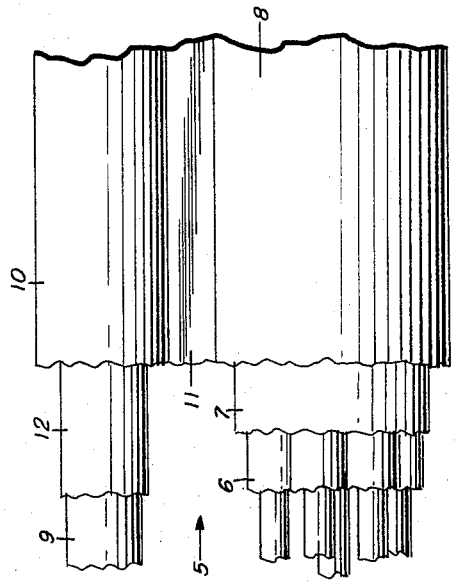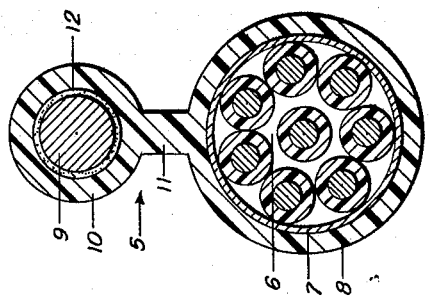
INVENTOR
BRANDON B. PUSEY
WARNER T. SMITH
BY
ATTORNEY United States Patent Office  3,267,201
Patented August 16, 1966

This invention relates to electrical conducting cables of the type incorporating a supporting messenger wire in a common insulating envelope or jacket, and consists more particularly in new and useful improvements in this type of messenger cable wherein the supporting messenger is formed of a solid wire to which the jacket is adhesively bonded.

Conventional messenger cables of this general type have employed stranded wire for the supporting messenger, and in the manufacture of such cables, the jacket material which is applied in the molten state, tends to follow the contours of the individual wires in the strand of supporting cable, with the result that a gripping action is effected which prevents movement of the cable core and the jacket with respect to the messenger.

For economical reasons, these stranded wire supporting messengers have been replaced with a solid supporting wire, but it has been found that relative motion between the jacket and the messenger frequently occurs, since the jacket material cannot grip the solid supporting wire with a sufficient gripping action to avoid relative movement. Experience has shown that in the use of this type of cable in the field, if the cable is installed on a grade, the jacket and cable core tend to slide along the supporting wire toward the lowest point in the grade. Thus, with gravity imposing a continuous force on the cable core, vibrations in the earth and wind movements cause the cable to creep downhill with the result that the conductors in the cable core elongate and break near the top of the grade.

Also, in certain windy areas of the country, it is desirable to twist a spiral into the cable and messenger to equalize wind forces throughout a span, and when a single solid wire messenger is employed with the cable jacket loose thereon, the cable merely rotates around the messenger and it is impossible to twist a spiral into the span.

Attempts have been made to remedy this condition by employing a mechanical gripping action between the jacket and the solid supporting wire, such for example, as by providing the solid wire with peripheral deformations which engage and grip the jacket. However, the provision of deformations in the wire presents a difficult and expensive problem from the standpoint of manufacture, and furthermore, after such a wire is galvanized, this procedure damages the zinc coating which subsequently shortens the life of the product.

It is therefore the primary object of the present invention to provide a messenger cable embodying a solid messenger wire which is adhesively bonded to the jacket. The bonded messenger cable of the present invention provides performance characteristics identical to the messenger cable employing stranded supporting wire, and at the same time, permits the use of the more economical solid wire with none of the disadvantages of the surface deformed solid wire.

Another object of the invention resides in the method of bonding a solid supporting wire within the common jacket surrounding the cable core.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is a diagrammatic illustration of one method which may be employed in producing the bonded messenger cable of the present invention;

FIG. 2 is a transverse sectional view through the fabricated messenger cable of the invention; and FIG. 3 is a fragmentary view in side elevation, partially broken away, to illustrate the various elements of the invention.

In the drawings, referring first to FIGS. 2 and 3, the bonded messenger cable of the invention is indicated generally by the numeral 5 and consists of a cable core 6 comprising a conventional series of insulated conductor strands. The core 6 is enveloped by the usual core covering tape 7 and is covered by a tubular polyethylene cable jacket 8. Above the core 6 and spaced laterally therefrom, is a parallel, single supporting or messenger wire 9 which is preferably composed of zinc covered steel and separately enclosed in a polyethylene jacket 10, formed integrally with the core jacket 8 and spaced therefrom by an integral, intervening web 11. As will later appear, the composite jacket 8, 10 and the web 11 are applied to the respective core and messenger wire by a conventional extrusion process. However, incorporated in this process of fabrication, is a novel method of applying an adhesive layer 12 which is bonded to the solid messenger wire 9 and the surrounding jacket portion 10. In the drawings, this adhesive layer 12 is somewhat exaggerated in thickness for purposes of illustration.

A method and apparatus for producing a bonded messenger cable in accordance with the invention is diagrammatically illustrated in FIG. 1, where 13 represents a pay-off reel carrying a supply of solid support wire 9 which is preferably a zinc coated steel wire. 14 is a similar pay-off reel carrying a supply of prefabricated conventional cable core 6. Following in the production line and diagrammatically illustrated at 15 is a preheater, preferably of the electric resistance type and including a series of rollers 16 over which the messenger wire 9 is adapted to pass in its course through the preheater. From the preheater 15, the messenger wire passes through the trough of an adhesive applicator 17, mounted on a stand 18, and aligned with the final roller 16 in the preheater. A conventional extruder 19, having a supply hopper 20 for molten polyethylene or the like, is disposed adjacent the adhesive applicator 17 and this is followed by a cold water cooling trough 21, spaced a predetermined distance from the exit end of the extruder 19, as will later appear.

The cable core 6 fed from pay-off reel 14, is caused to bypass the preheater 15 and passes over a downwardly offset roller 22, mounted on the stand 18, and posterior to the adhesive applicator 17, the core is brought upwardly over a second roller 23 to align it with the inlet end of the crosshead of extruder 19, where a composite polyethylene jacket 8, 10 with its intervening web 11, is formed around the cable core 6 and supporting wire 9, which is then conducted to the spaced cooling trough 21. As the jacketed cable leaves the extruder 19, it embodies a cross-sectional shape, as represented by FIG. 2.

More specifically, in practicing the method of the invention, the zinc coated steel messenger wire 9 is first preheated in preheater 15 to a temperature of between 280° and 330° F., and while at this elevated temperature, the wire is immediately passed through the adhesive applicator 17. In this applicator, the periphery of the solid wire is caused to contact flakes of a maleic modified high density polyethylene containing active polar groups, contained in the trough of the applicator 17. A material suitable for this purpose is manufactured by Union Carbide Plastics Company and designated by them as "DQDA 0301," although other materials having these characteristics may be used.

During its passage through the adhesive applicator 17, the hot messenger wire 9 melts the flakes above referred to, and picks up a thin layer 12 (FIG. 2) of modified polyethylene which is deposited on the wire in liquid form, and the adhesive coated wire, along with the simultaneously advancing cable core 6, is immediately passed into the crosshead of the extruder 19 where the composite polyethylene jacket 8, 10, in a molten state and at a temperature of approximately 400° F., is formed around the cable core and supporting wire.

As the jacketed cable exits from the extruder, it is cooled by air for a short distance, as seen in FIG. 1, and then immersed in the cold water trough 21 which, as will later appear, may comprise two longitudinally aligned troughs for providing sequential water cooling stages.

It should be noted that the heat balance during the cooling cycle is critical. It is desirable before the polyethylene jacket 8, 10 is solidified completely, to cool the surface of the zinc coated steel wire to a temperature below 250° F., at which temperature the maleic modified high density polyethylene will solidify and form a bond between the zinc coated steel wire and the polyethylene jacket. After the bond is established, further cooling of the jacket can take place with no disruption of the bonding. If too long a period is allowed before the polyethylene jacket is cooled to below 250° F., however, damage to the insulated conductors 6 within the jacket can occur, along with deformation of the web 11 connecting the main body of the cable to the supporting wire. It is therefore important that a correct balance be established to permit the bonding of the polyethylene jacket 10 to supporting wire 9, without damage to the conductor insulation or the web of the jacket.

The factors affecting the rate of heat removal during the cooling cycle, are the size of the zinc covered steel wire 9 and the wall thickness of the polyethylene jacket 10. The smaller the wire 9 and the thinner the jacket wall 10, the easier it is to achieve an acceptable rate of heat removal. On the other hand, large wires with heavy polyethylene jacket walls, require very close control of the rate of heat removal.

The following approximate examples will illustrate two typical heat removal procedures in the fabrication of bonded messenger cables of different specifications:

(1) 6 pair 19 gauge with .109" supporting wire
Wall thickness of jacket—.040"
Supporting wire temperature—300° F.
Polyethylene stock temperature—400° F.
Line speed—155 feet per minute
Air cooling space—14"
1st cooling water trough—65° F.—14' long
2nd cooling water trough—80° F.—30' long
(2) 18 pair 19 gauge with .134" supporting wire
Wall thickness of jacket—.060"
Supporting wire temperature—300° F.
Polyethylene stock temperature—400° F.
Line speed—88 feet per minute
Air cooling space—8"
Two jets of 65° F. water sprayed on web section of cable 4" from extruder exit
1st cooling water trough—65° F.—14' long
2nd cooling water trough—80° F.—30' long While the above-described method has been found highly satisfactory for adhesively bonding a polyethylene jacket to a solid supporting wire in a self-supporting cable, it will be obvious that other methods of adhesive bonding may be employed. Furthermore, the present invention contemplates the use of materials other than polyethylene, provided an adhesive suitable for use with the particular material is employed. One such material which has proven satisfactory is polyvinyl chloride, with which we used as an adhesive, a modified polyvinyl chloride manufactured by Union Carbon Plastics Company and designated by them as "VMCH." Also, it is possible to bond these materials to wires other than zinc covered steel wire, such for example, as copper and copper covered steel wire, as well as aluminum and aluminum covered steel wire.

It will be apparent that the method and article of this invention provide a bonded messenger cable having all of the advantages of the conventional messenger cables employing stranded supporting wire, while at the same time, enabling the use of the more economical solid supporting wire.

From the foregoing, it is believed that the invention may be readily understood by those skilled in the art without further description, it being borne in mind that numerous changes may be made in the details disclosed without departing from the spirit of the invention as set forth in the following claims.

We claim:

1. A bonded messenger cable, comprising a cable core, a solid, single strand smooth surfaced supporting wire, a common jacket of polyethylene enveloping said supporting wire in laterally spaced, parallel relation, and a continuous layer of a maleic modified, high density polyethylene directly and uniformly embracing all points of the periphery of said supporting wire and providing the sole active agent for means adhesively bonding that portion of said jacket covering said supporting wire, directly to the periphery of the latter, thereby preventing relative movement between the supporting wire and the jacket.

2. A bonded messenger cable as claimed in claim 1, including a zinc coated steel supporting wire.

3. A bonded messenger cable, comprising a cable core, a solid, single strand smooth surfaced steel supporting wire, a common jacket of polyethylene enveloping said core and supporting wire in laterally spaced, parallel relation, and a continuous layer of polyethylene modified with a material containing active polar groups, directly and uniformly embracing all points of the periphery of said supporting wire and providing the sole active agent for adhesively bonding that portion of said jacket covering said supporting wire, directly to the periphery of the latter, thereby preventing relative movement between the supporting wire and the jacket.

References Cited by the Examiner
UNITED STATES PATENTS

| | | | |
|---|---|---|---|
| 960,291 | 6/1910 | Egner et al. | 174—70 |
| 1,721,218 | 7/1929 | Hood | 174—70 |
| 2,291,670 | 8/1942 | Wiley et al. | 264—174 |
| 2,427,196 | 9/1947 | Cox | 174—120 |
| 2,456,304 | 12/1948 | Morin | 264—174 |
| 2,956,311 | 10/1960 | Raydt et al. | 174—41 X |

OTHER REFERENCES

Rutenbeck: German ptd. application No. 1,106,381, pub. May 10, 1961.

LEWIS H. MYERS, *Primary Examiner.*

JOHN F. BURNS, *Examiner.*

J. F. RUGGIERO, *Assistant Examiner.*